166-273
7/7/81       XR    4,276,933    SR

United States Patent [19]
Kudchadker et al.

[11] 4,276,933
[45] Jul. 7, 1981

[54] SURFACTANT WATERFLOOD METHOD FOR THE RECOVERY OF OIL

[75] Inventors: Mohan V. Kudchadker; George Kalfoglou, both of Houston; Lawrence E. Whittington, Katy, all of Tex.

[73] Assignee: Texaco Inc., White Plains, N.Y.

[21] Appl. No.: 101,598

[22] Filed: Dec. 10, 1979

Related U.S. Application Data

[63] Continuation-in-part of Ser. No. 900,962, Apr. 28, 1978, abandoned.

[51] Int. Cl.³ .............................................. E21B 43/24
[52] U.S. Cl. ..................................... 166/266; 166/273
[58] Field of Search ............ 166/266, 273, 274, 305 R

[56] References Cited

U.S. PATENT DOCUMENTS

| | | | |
|---|---|---|---|
| 3,373,809 | 3/1968 | Coore, Jr. ............................ | 166/273 |
| 3,437,140 | 4/1969 | Foster et al. .......................... | 166/273 |
| 3,474,864 | 10/1969 | Hurd ................................. | 166/273 X |
| 3,500,924 | 3/1970 | Poettmann ....................... | 166/273 X |
| 3,507,331 | 4/1970 | Jones ................................... | 166/273 |
| 3,520,365 | 7/1970 | Jones ................................... | 166/273 |
| 3,637,017 | 1/1972 | Gale et al. ............................ | 166/274 |
| 3,658,130 | 4/1972 | Davis, Jr. et al. ................... | 166/273 |
| 3,990,515 | 11/1976 | Wilchester et al. .................. | 166/273 |
| 4,004,637 | 1/1977 | Needham et al. .................... | 166/273 |

*Primary Examiner*—Stephen J. Novosad
*Assistant Examiner*—George A. Suchfield
*Attorney, Agent, or Firm*—Carl G. Ries; Robert A. Kulason; Charles L. Bauer

[57] ABSTRACT

An improved surfactant waterflood method for the recovery of oil from a subterranean reservoir utilizing an anionic surface-active agent wherein an aqueous postflush slug containing a nonionic solubilizer is employed to minimize retention of the surface-active agent in the reservoir matrix.

10 Claims, No Drawings

SURFACTANT WATERFLOOD METHOD FOR THE RECOVERY OF OIL

This is a continuation-in-part of application Ser. No. 900,962 filed Apr. 28, 1978, now abandoned.

FIELD OF THE INVENTION

This invention relates to the recovery of oil by a surfactant waterflood employing an anionic surface-active agent wherein a postflush with an aqueous slug containing a nonionic solubilizer is utilized to increase the recovery of oil by minimizing the retention of the anionic surface-active agent in the reservoir, so that the beneficial capabilities of the anionic surface-active agent are more fully exploited.

DESCRIPTION OF THE PRIOR ART

Primary production of oil from subterranean oil-bearing reservoirs is normally obtained by exploiting the natural energy of the reservoir in the form of water drive, gas-cap drive, solution-gas drive and combinations thereof. Oil remaining in the reservoir after primary energy sources have been depleted may be partially recovered by secondary recovery methods, the most common of which is waterflooding. In this method, water is injected into the reservoir through one or more injection wells traversing the oil-bearing reservoir which water serves as the drive agent to displace the oil in the reservoir toward one or more production wells from which the oil is produced. However, this secondary method may recover only up to 30–50 percent of the remaining oil in place, thus leaving considerable quantities of oil in the reservoir.

Many improvements have been suggested to increase the recovery of oil by waterflooding, one of which is the use of surfactants or surface-active agents contained in an aqueous or non-aqueous slug that is injected ahead of the flooding water. It is believed that these agents effect improved recovery of oil by increasing the wettability of the reservoir matrix by water and by decreasing the interfacial tension between the oil and the water phases. Although anionic, cationic and nonionic surfactants and mixtures thereof have been suggested, the anionic surfactants, and particularly the petroleum sulfonates, have gained the widest recognition as waterflood surfactant additives.

Other improvements in waterfloods that have been suggested include the use of water-soluble polymers in the flooding water, whereby the viscosity of the flood water is increased. The "thickened" water results in a more favorable mobility ratio and leads to improved oil recovery. The polymeric compounds may be incorporated in a slug sometimes referred to as a "mobility control" slug which is injected prior to the injection of the flooding water. Among the materials suggested are the water-soluble hydrolyzed or partially hydrolyzed acrylamide polymers such as "Dow Pusher 700" manufactured by the Dow Chemical Co. and the polysaccharides such as "Kelzan" or "Xanflood" manufactured by Kelco, a division of Merck & Co.

In addition, it is known that the interfacial tension can be lowered by the use of a monovalent water-soluble salt such as the alkali metal halides of sodium and potassium in the various injected slugs. In this regard sodium chloride is the most commonly used material.

With the advances in the art of surfactant flooding, the methods employed today generally involve the injection into the reservoir of a slug of the surfactant containing anionic, cationic or nonionic surfactants or mixtures thereof, together with additives such as monovalent salts (sodium chloride). The surfactant slug is followed, optionally, by a mobility control slug containing a thickening agent, which slug is then followed by the flooding water. Such a scheme is disclosed in U.S. Pat. No. 3,477,511. From the combined use of a surfactant solution to decrease the surface tension between the injected aqueous fluid and the oil in the reservoir and a solution of polymeric material to improve the mobility ratio and displacement efficiency, the benefits of both are realized.

Variations of the general scheme may include incorporating the surfactant and the polymeric material or thickener into one slug, and also the preconditioning of the reservoir by the injection of "pretreatment" slugs containing generally inorganic soluble salts that function to make the reservoir and its fluids more compatible with the subsequently injected surfactant and mobility control slugs. The variations of the general scheme for surfactant flooding are dictated by the reservoir characteristics, the type and composition of the oil and the type and composition of the connate water. For example, among the factors that must be considered is the salinity of the connate water and the presence or absence of divalent ions in the connate water.

The use of these surfactant systems employing such surface-active agents has not always been satisfactory because of the fact that these systems exhibit surfactant losses. These losses result from retention of the surfactant in the formation because of, it is believed, (1) adsorption on the reservoir matrix, (2) precipitation in the connate waters when divalent ions are present, (3) dissolution in the in-place oil as very oil-soluble divalent sulfonates, and (4) entrapment in the blind pores of the reservoir matrix.

With the retention of the surfactant and the resulting ever-declining concentration of surfactant with distance from the point of injection, the recovery operation becomes progressively ineffective. In order to maintain a sufficient concentration of the surfactant at the oil/water interface, it has been necessary to use either a very high concentration of surfactant in the surfactant slug or larger slug sizes. Since waterflood operations typically involve enormous quantities of injected fluid, amounting to hundreds of millions of gallons of water, the use of surfactants in sufficiently high amounts to compensate for their retention in the reservoir is not economically feasible.

One approach to the problem of surfactant losses has been the use of sacrificial chemicals to pretreat the reservoir. These chemicals serve to reduce losses because of adsorption on the reservoir matrix of the subsequently injected surfactant. Among the teachings of the use of sacrificial chemicals are U.S. Pat. No. 3,414,054 that discloses the use of pyridine; U.S. Pat. No. 3,469,630 that teaches the use of sodium carbonate and inorganic polyphosphates; and U.S. Pat. No. 3,978,927 that teaches the use of an ethoxylated asphalt.

Other combinations are found in the prior art as in the U.S. Pat. No. 3,437,141 that utilizes sacrificial agents such as soluble carbonates, inorganic phosphates or sodium borate in combination with a saline solution of a surfactant having both a high molecular weight and a low molecular weight component followed by a saline solution of the low molecular weight component of the surfactant. In yet another teaching, as in U.S. Pat. No.

3,474,864, desorption of the surfactant is enhanced by the use of an aqueous saline solution of a petroleum sulfonate surfactant that is displaced by a bank of less saline water. The less saline water desorbs the surfactant from the reservoir matrix and enables it to move further into the reservoir.

Another approach to the problem is found in U.S. Pat. No. 3,126,952 that teaches the injection of a treated oil bank, containing an oil-soluble, substantially water-insoluble alcohol and an oil-soluble surface-active agent ahead of the water in a waterflood. The two appear to combine to form a molecular aggregate that greatly changes the functions of the surface-active agent; one effect being that of decreasing the adsorption of the surface-active agent on the matrix. In another variation, U.S. Pat. No. 3,637,017, teaches that, after an aqueous slug of a petroleum sulfonate has been injected into the reservoir, the slug be displaced with water containing minor amounts of a low molecular weight alcohol having no more than eight carbon atoms. It is theorized that the dilute alcohol solution remobilizes the surfactant entrapped in the rock and moves it forward to recover additional oil. There is also taught that the alcohol solution may contain a viscosity-increasing agent. The alcohols taught are the aliphatic hydrocarbons with hydroxyl substituents having no more than eight carbon atoms.

The problem of surfactant loss is a major factor in establishing the optimum volume of the expensive micellar fluid needed in a surfactant flood has also been discussed in the publication, "Micellar Flooding: Sulfonate-Polymer Interaction", by S. P. Trushenski, that was presented at the 81st meeting of AIChE in Kansas City Apr. 11-14, 1976. The paper sets forth that the incompatibility of the sulfonate-polymer system results in multiple phases developing as the polymer invades the micellar fluid, which results in phase trapping in the porous media. The paper suggests that by reducing the salinity of the mobility bank behind the micellar slug or increasing the concentration of the sulfonate solubilizers in the micellar and mobility banks the problem of incompatibility may be substantially reduced.

The loss of surfactant to the reservoir is also recognized in U.S. Pat. No. 3,990,515 which discloses reducing such loss by the injection of a "chaser" following the injection of the surfactant slug. The chaser is a water-soluble anionic dispersing agent that is more water-soluble than the material to be chased. Examples are the alpha olefin sulfonates, the sulfated oxyalkylated alcohols, and the dialkyl sulfosuccinates.

Despite the methods set forth in the prior art the need still exists for methods to inhibit or reduce the retention of the surfactant in the reservoir matrix, thereby maximizing the effectiveness of the surfactant in a surfactant waterflood.

It is thus an object of this invention to provide a method to reduce the retention of the surfactant in a reservoir during a surfactant waterflood operation.

It is also an object of this invention to enhance the recovery of oil from a subterranean oil-bearing reservoir by the better exploitation of the surfactant in a surfactant waterflood operation.

SUMMARY OF THE INVENTION

This invention relates to the recovery of oil from a subterranean formation by a surfactant waterflood employing an anionic surfactant agent wherein an aqueous slug containing a nonionic solubilizer is injected after the injection of the surfactant slug to minimize the retention of the surfactant in the reservoir during the waterflood.

DESCRIPTION OF THE PREFERRED EMBODIMENT

This invention relates to an improved surfactant waterflood oil recovery process wherein retention of the injected anionic surfactant is minimized and its availability for recovery of additional oil from the formation is enhanced. More particularly, the invention is applicable to surfactant waterflood processes that employ the use of slugs containing anionic surfactants, in particular the petroleum sulfonates, alkylaryl sulfonates, alkyl sulfonates and their salts.

These anionic sulfonates may also be utilized in conjunction with cosurfactants which become necessary in high salinity and hardness reservoir environments. Typically, if the total dissolved solids exceed about 25,000 g/m$^3$ and divalent ion concentration exceeds about 200 g/m$^3$, cosurfactants have to be used in conjunction with the organic sulfonates. The usual cosurfactants are low molecular weight alcohols and polyalkoxylated alcohols or polyalkoxylated alkyl phenols for low salinity, low temperature applications; sulfated derivatives for low temperature, high salinity and hardness conditions; and sulfonated derivatives for high temperature, high salinity and hardness conditions.

Despite the fact that the cosurfactant employed with the sulfonate may be a nonionic surface-active agent, we have found that its presence in the anionic slug does not apparently affect the retentive propensities of the anionic surfactant in the matrix.

Further, we have found that the employment of a postflush, in methods using surfactant systems for the recovery of oil from subterranean reservoirs, is effective in reducing the losses of the surfactant. More particularly, nonionic solubilizers are effective in minimizing retention of anionic surfactants in a reservoir wherein the nonionic solubilizers are contained in an aqueous slug that is injected into the formation after the injection of the surfactant slug. By the use of the postflush, significant amounts of the previously retained surfactant can be released for further recovery exploitation in the continuing waterflood.

It is postulated that the presence of the nonionic solubilizer serves to minimize the retention of the surfactant by the reservoir by the combined actions of desorption of the surfactant from the reservoir matrix, by the beneficial repartitioning of the surfactant from the oil phase back into the water phase, and by the solubilization of the previously precipitated divalent sulfonates.

The nonionic solubilizers that are effective in this invention include the water-soluble alkoxylated alcohols, the alkoxylated alkylphenols, and the alkoxylated mercaptans. The alkyl precursors of the alcohols, alkylphenols and mercaptans have from 9 to 16 carbon atoms in the molecule. With respect to the alkoxylated portion of the alcohols, alkylphenols and mercaptans, these have from 1 to 20 ethylene oxide or propylene oxide groups in the molecule to give the required water solubility. These nonionic solubilizers have the ability to repartition the sulfonates that have been partitioned into the oil phase and also to redissolve the sulfonates that have precipitated because of the high concentration levels of brine or the presence of calcium or magnesium salts in the connate water.

The invention may be applied to any enhanced recovery operation utilizing anionic surfactants. In practice, the invention is carried out by the injection of an aqueous slug containing the nonionic solubilizer after the injection of the surfactant slug containing the anionic surfactant. It is also within the scope of the invention to incorporate the solubilizer in a slug containing a polymeric material as a thickening agent or mobility control agent such as a polyacrylamide or polysaccharide. The solubilizer slug may also be injected as a separate aqueous slug after the mobility control slug has been injected.

It is known that the properties of an anionic surfactant such as a petroleum sulfonate to enhance oil recovery are adversely affected, among other things, by the undesirable partitioning of the surfactant from the aqueous water phase into the oil phase. The following laboratory test demonstrates the effectiveness of an aqueous solution of a nonionic solubilizer to repartition an anionic surfactant such as a petroleum sulfonate from an oil phase into a water phase thereby reclaiming by extraction the surfactant so that it may be further utilized as an oil recovery agent. In the test, an aqueous brine solution containing a polysaccharide was prepared to simulate a polymer or mobility control slug. The solution contained 6000 g/m$^3$ of sodium chloride and 700 g/m$^3$ of a polysaccharide (Xanflood). A portion of this brine solution, to serve as the standard for comparison, was placed in contact with a sample of a 32° API crude containing 775 mg of a calcium petroleum sulfonate and 190 mg of a sodium petroleum sulfonate. To a second portion of the brine solution containing the polysaccharide was added a nonionic solubilizer (ethoxylated nonylphenol) having an average of 12.0 moles of ethylene oxide per mole of nonylphenol in amounts to give a concentration of 10,000 g/m$^3$. This portion was also placed in contact with an oil sample containing a calcium and a sodium petroleum sulfonate. Both solutions were agitated gently for one week, after which the oil and the water phases were analyzed for surfactant. The results showing the extraction of the sulfonate are presented in the following table.

EXTRACTING PETROLEUM SULFONATES FROM OIL WITH POLYMER SOLUTIONS CONTAINING SOLUBILIZER

| | | Quantity of Petroleum Sulfonate | | | |
|---|---|---|---|---|---|
| | Solubilizer | In Oil Phase | In Aqueous Phase | | |
| Test | Conc. g/m$^3$ | Initial mg | Initial mg | Final mg | Percent Recovery |
| (Standard) | 0 | 37 | 0 | 5 | 14% |
| Solubilizer | 10,000 | 37 | 0 | 36.3 | 98% |

Initially all of the sulfonate was in the oil phase in the form of calcium and sodium petroleum sulfonates. After one week, the results show that the nonionic solubilizer effectively caused the partitioning of 98% of the sulfonates from the oil phase into the aqueous phase, or, in other terms, extracted the sulfonate from the oil phase whereas the solution used as the standard, i.e. without the solubilizer, had extracted only 14% of the surfactant.

In other series of tests the effectiveness of the solubilizers to redissolve precipitated petroleum sulfonates of calcium was demonstrated. In the tests an aqueous solution containing 4,900 g/m$^3$ of petroleum sulfonate in 6,000 g/m$^3$ sodium chloride brine was used as the stock solution. To one portion of the stock solution, enough calcium nitrate was added to simulate a connate field water having high divalent ion content. After the calcium petroleum sulfonate had precipitated, an aliquot was filtered and analyzed for sulfonate content, and an ethoxylated nonylphenol solubilizer was added to the samples containing precipitated calcium petroleum sulfonates and the sample was agitated for 16 hours and analyzed for sulfonate content. The results are given in the following table:

DISSOLVING PRECIPITATED CALCIUM SULFONATES IN AN AQUEOUS MEDIA WITH NONIONIC SOLUBILIZERS

| Solubilizer | | Quantity of Petroleum Sulfonate in Aqueous Media | | |
|---|---|---|---|---|
| Type | Concentration wt. % | Initial mg. | After addition of Ca(NO$_3$)$_2$ mg. | After addition of solubilizer mg. |
| None | -0- | 490 | 9.9 | -0- |
| 1. Surfonic N-120 | 0.5 | 490 | 9.9 | 460 |

1. Ethoxylated Nonylphenol Average of 12 ethoxy groups between aromatic ring & terminal hydroxy group (Jefferson Chem. Co.)

The results clearly demonstrate that solubilizers such as ethoxylated nonylphenol are effective in dissolving precipitated calcium petroleum sulfonates in aqueous media.

In order to demonstrate the effectiveness of the solubilizer to reclaim surfactant, a core displacement test was conducted wherein a postflush using an aqueous brine solution containing a nonionic solubilizer, was injected into the core after the surfactant slug. In the test, a core, suitably mounted, and saturated with a 32° API crude, was subjected to a surfactant flood. Initially, a 0.5 Pore Volume (PV) aqueous slug was injected, that contained 0.4% of an anionic surfactant (dodecylbenzene sulfonate); 0.6% ethoxylated nonylphenol having approximately 10.6 moles of ethylene oxide per mole of nonylphenol; and 0.5% of a lignosulfonate used as a sacrificial agent. After the surfactant slug had been injected, a 1.24 PV aqueous mobility control slug was injected that contained 1000 ppm of the polysaccharide Kelzan. Thereafter, the core was subjected to a postflush in which a 1.25 PV aqueous slug containing 10,000 g/m$^3$ of the nonionic solubilizer ethoxylated nonylphenol, was injected. The core was then flooded with 0.79 PV of simulated connate water. From the results of the test 10.3% of the oil was recovered by the end of the injection of the mobility control slug and an additional 14.0% of the oil was recovered after the postflush. Not only did the recovery increase significantly from 10.3 to 24.3%, but also 98% of the surfactant was recovered after the postflush.

In a second displacement test the effectiveness of a postflush slug in which the solubilizer and a polymeric material were present was demonstrated. In the test, a core, suitably mounted, and saturated with a 32° API gravity crude was subjected to a surfactant flood in which a 0.41 PV aqueous slug was first injected. The slug contained a blend of petroleum sulfonates at a concentration of 1.51 wt. % and a nonylphenolpolyethoxyhydroxy propane sulfonate at a concentration of 0.49 wt. %. The petroleum sulfonates comprised a mixture of 25% of an oil-soluble petroleum sulfonate having an equivalent weight of 450-550 and 75% of a water-soluble petroleum sulfonate having an equivalent weight of 250-450. This first slug was followed by the injection of 1.76 PV mobility control slug that contained 10 kg/m$^3$ of a polysaccharide. Tertiary recovery of oil at the end of the polymer flood was 26.5%. Analyses of the effluents showed no surfactant had been produced. Thereafter, according to the invention, a postflush was undertaken in which a 1.3 PV aqueous postflush slug was injected, that contained 90,000 ppm of sodium chloride and 0.5% by weight of an ethoxylated nonylphenol having about 12 moles of ethylene oxide per mole of nonylphenol. Oil recovery showed an immediate increase and resulted in an additional tertiary recovery of about 27% for a final recovery of 54%. In addition, the effluent analyses showed that about 62% of the originally injected petroleum surfactant was recovered.

In a third displacement test the effectiveness of a postflush slug containing a nonionic solubilizer was demonstrated, after a low molecular weight alcohol had been injected. In the test, a core, suitably mounted, and saturated with a 32° API crude and connate brine was subjected to a surfactant flood by the injection of a 0.4 PV aqueous slug containing a blend of petroleum sulfonate with ethoxy sulfonate at a total concentration of 2.0%. Thereafter, a mobility control slug was injected that contained 1,000 ppm of a polysaccharide. After the oil and surfactant production had ceased, a 1.8 PV slug containing 0.5% n-butanol in brine was injected followed by a 1 PV slug of brine and 2.1 PV slug of ethoxylated n-butanol. Thereafter, a 2.25 PV slug of the nonionic ethoxylated phenol solubilizer, having nine carbon atoms in the molecule was injected. The results showed that 20.4% recovery was obtained after the mobility control slug had been injected and further that no additional recovery was obtained during the injection of the slugs containing n-butanol or ethoxylated n-butanol. However, an additional 27.9% recovery was obtained by the injection of the slug containing ethoxylated nonylphenol and, further, 37% of the injected surfactant was recovered.

In yet another displacement test, a core was saturated with a 32° API oil and brine was waterflooded. Thereafter, a surfactant flood using a 0.25 PV slug containing a petroleum sulfonate and an ethoxy sulfate was injected, followed by the injection of a mobility control slug. After the production had decreased, a 1.8 PV slug containing ethoxylated n-butanol was injected followed by a 2.8 PV slug containing an ethoxylated nonylphenol. The results showed that a 27.4% recovery was obtained after the injection of the mobility control slug, but no additional recovery was obtained by the use of an ethoxylated n-butanol slug. However, the oil recovery was doubled upon the use of the slug of the ethoxylated nonylphenol and also 45% of the surfactant was recovered. The result showed that ethoxylated n-butanol did not recover any surfactant nor did it produce additional oil. In contrast, upon the postflush using an ethoxylated nonylphenol, having a carbon chain of nine, additional oil and sulfonate surfactant were recovered.

Thus, the core displacement tests showed that a postflush of a nonionic solubilizer slug resulted not only in enhaced oil recovery but also in effective reclamation of the surfactant.

In its broadest aspect this invention relates to a method for recovering oil from a subterranean oil-bearing reservoir having at least one injection well and at least one production well which comprises:

(1) injecting into the formation via the injection well an aqueous slug containing an anionic surfactant, (2) optionally, thereafter, injecting an aqueous slug of a polymer for mobility control, (3) injecting a postflush aqueous slug containing a nonionic solubilizer, selected from the group consisting of alkoxylated alcohols, alkoxylated alkylphenols, and alkoxylated mercaptans wherein the alkyl portion of the said alcohols, alkylphenols and mercaptans have from 9 to 16 carbon atoms and the alkoxylated portion of the said alcohols, alkyphenols and mercaptans have from 1 to 20 ethylene oxide or propylene oxide groups, (4) injecting flood water to displace the reservoir oil and the aqueous slugs through the reservoir to a production well from which both recovery of reservoir oil and surfactant is realized.

It is within the scope of the invention that the produced aqueous fluids be separated from the produced oil, and thereafter be reinjected into the reservoir whereby the recovered surfactant and solubilizer in the aqueous phase are utilized in continuing the surfactant waterflood.

In practicing the invention it is recommended that the slug containing the nonionic solubilizer be injected in an amount of from about 0.1 to about 2.0 of the reservoir pore volume (PV). It is preferred that the slug contain the nonionic solubilizer in amounts of from about 0.25% to about 1.50% by weight. Optionally, the slug may contain mobility control polymer and an alkali salt to adjust salinity for compatibility with the reservoir fluids.

The method of the invention may employ a conventional 5-spot type pattern wherein the central well is the injector and the four offset wells serve as the producers. Alternately, a conventional line drive may be employed with one line serving as the injector wells and two adjacent lines serving as the producers.

We claim:

1. In a method of recovery of oil from a subterranean oil-bearing reservoir traversed by at least one injection well and at least one production well wherein a first aqueous slug containing an anionic surfactant is injected via said injection well and thereafter an aqueous drive agent is injected via said injection well to displace said surfactant slug and said oil through the reservoir to said production well from which production occurs, the improvement comprising the injection via said injection well of a postflush aqueous slug prior to the injection of said drive agent; said postflush containing a nonionic solubilizer selected from the group consisting of alkoxylated alcohols, alkoxylated alkylphenols, and alkoxylated mercaptans wherein the alkyl portion of the said alcohols, alkylphenols and mercaptans have from 9 to 16 carbon atoms and the alkoxylated portion of the said alcohols, alkylphenols and mercaptans have from 1 to 20 ethylene oxide or propylene oxide groups.

2. The method of claim 1 wherein said postflush aqueous slug contains a polymeric agent for mobility control.

3. The method of claim 2 wherein said polymeric agent for mobility control is selected from the group consisting of polyacrylamides, polysaccharides and mixtures thereof.

4. The method of claim 1 wherein an aqueous slug containing a polymeric agent for mobility control is injected prior to the injection of said postflush slug.

5. The method of claim 4 wherein said polymeric agent for mobility control is selected from the group consisting of polyacrylamides, polysaccharides and mixtures thereof.

6. The method of claim 1 wherein said anionic surfactant in said first aqueous slug is selected from the group consisting of petroleum sulfonates, alkylaryl sulfonates, alkyl sulfonates, salts of said sulfonates, and mixtures thereof.

7. The method of claim 1 wherein said first aqueous slug also contains a cosurfactant selected from the group consisting of low molecular weight alcohols, alkoxylated alcohols, alkoxylated alkylphenols, sulfated derivatives of said alcohols and phenols, sulfonated derivatives of said alcohols and phenols and mixtures thereof.

8. The method of claim 1 wherein said postflush aqueous slug is injected in the amount of about 0.10 PV to about 2.0 PV.

9. The method of claim 1 wherein said postflush aqueous slug contains said solubilizer in amounts from about 0.25 wt. % to about 1.50 wt. %.

10. In the method of claim 1 wherein said production comprises oil and aqueous fluids containing said surfactant and solubilizer, the additional step of separating said aqueous fluid from said oil and reinjecting said aqueous fluid into said reservoir.

* * * * *